(12) United States Patent
Becker et al.

(10) Patent No.: US 7,644,992 B2
(45) Date of Patent: Jan. 12, 2010

(54) MOTOR VEHICLE SEAT WITH AN UNDERFRAME, A SEAT BELT AND A SEAT BELT RETRACTOR

(75) Inventors: Burckhard Becker, Solingen (DE); Wilfried Beneker, Leichlingen (DE); Frank Peters, Nettetal (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 11/900,742

(22) Filed: Sep. 13, 2007

(65) Prior Publication Data
US 2008/0116679 A1 May 22, 2008

(30) Foreign Application Priority Data
Sep. 13, 2006 (DE) .................. 10 2006 043 762

(51) Int. Cl.
*B60R 21/00* (2006.01)
*B60N 2/02* (2006.01)

(52) U.S. Cl. ..................... 297/474; 297/344.1

(58) Field of Classification Search ............. 297/474, 297/452.18, 344.1, 475, 476, 477, 478, 479; 280/807
See application file for complete search history.

(56) References Cited

U.S. PATENT DOCUMENTS

| 3,761,127 | A | * | 9/1973 | Giese et al. | 280/807 |
| 3,938,771 | A | * | 2/1976 | Urai | 248/429 |
| 4,213,651 | A | * | 7/1980 | Yoshitsugu et al. | 297/475 |
| 4,529,249 | A | * | 7/1985 | Ino | 297/474 |
| 4,568,106 | A | * | 2/1986 | Yokoyama | 280/807 |

FOREIGN PATENT DOCUMENTS

WO WO 9014245 A1 * 11/1990

* cited by examiner

*Primary Examiner*—Milton Nelson, Jr.
(74) *Attorney, Agent, or Firm*—McCarter & English, LLP

(57) ABSTRACT

A motor vehicle seat with an underframe comprising two pairs of rails, each having a seat rail and a floor rail, a seat belt and a seat belt retractor. The seat further comprises a tie bar for the seat belt retractor, the tie bar extending from the one seat rail to the other seat rail and is connected to the respective one of the seat rails. The seat belt retractor is connected to the tie bar and, in one embodiment, is disposed beneath the tie bar.

11 Claims, 3 Drawing Sheets

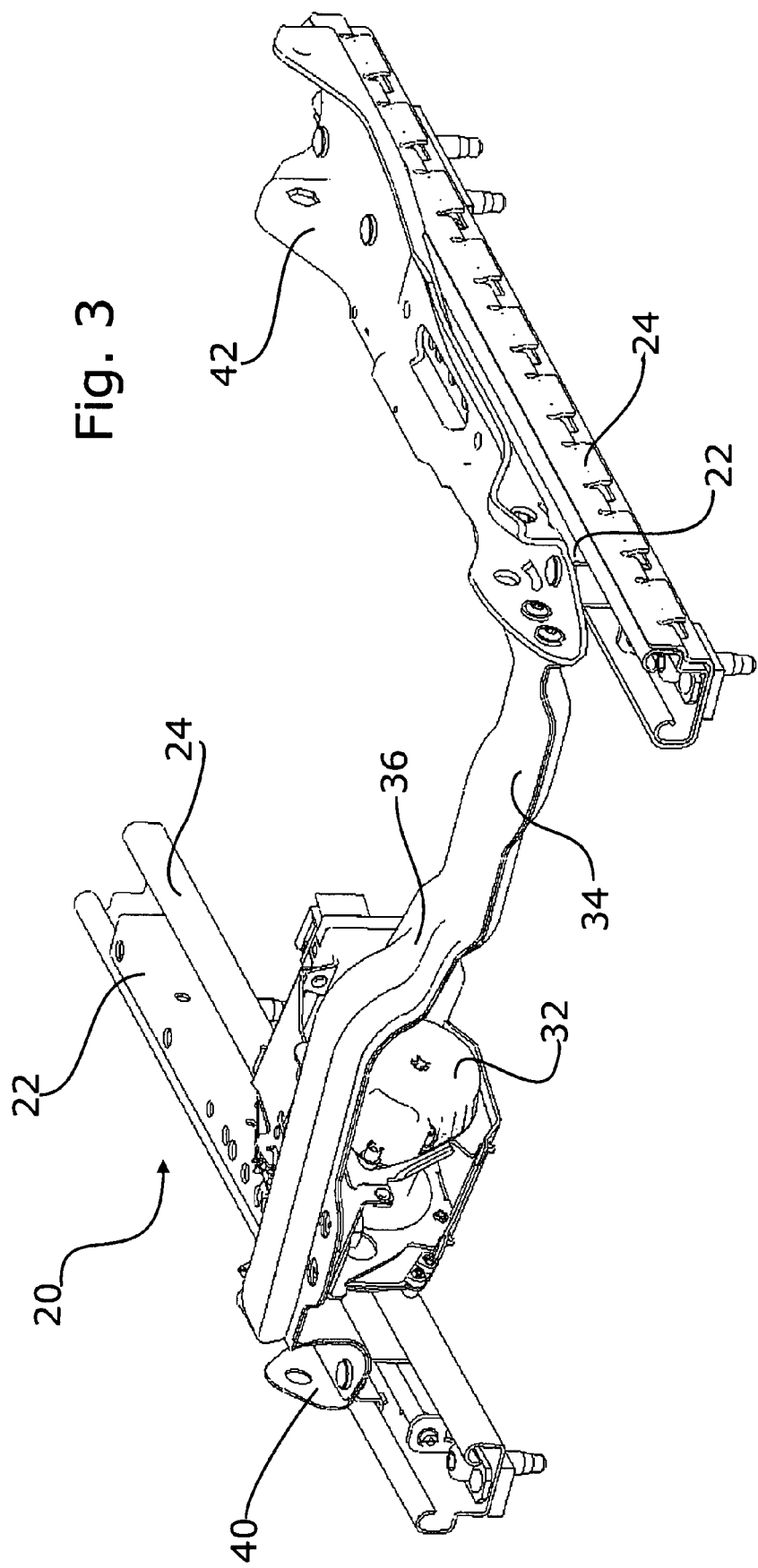

US 7,644,992 B2

MOTOR VEHICLE SEAT WITH AN UNDERFRAME, A SEAT BELT AND A SEAT BELT RETRACTOR

CROSS REFERENCE TO RELATED APPLICATIONS

This application claims priority to German Application No. DE 10 2006 043 762.4, filed Sep. 13, 2006, the contents of which are expressly incorporated by reference as part of the present disclosure.

BACKGROUND

The invention relates to a motor vehicle seat with an underframe comprising two pairs of rails, each having a seat rail and a floor rail, with a seat belt and with a seat belt retractor.

Such type vehicle seats are generally known, in particular they are what are termed integrated seats in which the ends of the safety belt are fixed on the seat itself and not on the car body. The invention is not limited thereto, though.

Modern motor vehicle seats are increasingly equipped with features and the corresponding devices need space. The space beneath the seat cushion is preferably used for this purpose. In the case of fully equipped motor vehicle seats though, there is only little space left there because of the many different devices. Therefore, there is a need for positioning discrete device parts, the seat belt retractor in particular, freely and for more specifically disposing it as far as possible in the front, for example beneath the seat front edge.

SUMMARY

It is the object of the invention to develop the motor vehicle seat of the type mentioned herein above in such a manner that the seat belt retractor may be placed somewhere where there is sufficient space for it. The motor vehicle comprises at least two pairs of rails, each including a seat rail and a floor rail, a seat belt and a seat belt retractor, and a tie bar for the seat belt retractor extending from the one seat rail to the other seat rail. The tie bar is connected to one of the seat rails, and the seat belt retractor is connected to the tie bar.

With the features of the preamble in mind, this object is solved by the fact that there is provided a tie bar for the seat belt retractor, that this tie bar extends from the one seat rail to the other seat rail and is connected to the respective one of the seat rails and that the seat belt retractor is connected to the tie bar, being more specifically disposed beneath the tie bar.

In accordance with the invention, the seat belt retractor has a specially devised tie bar associated with it. The tie bar may be disposed anywhere between the seat rails, it may be more specifically positioned quite far to the front or to the back in the x direction and far left or right in the y direction. It may for example be disposed between the hinge points of front rocker arms of the underframe. It may be disposed in a region beneath the seat front edge. Thanks to its own tie bar, which is associated with it, the seat belt retractor can be accommodated in the space that is not occupied by other devices. The tie bar can be configured so as to comply with the specific requirements imposed by the space situation and/or occurring in the event of an accident. A benefit is obtained if the forces acting onto the tie bar are introduced directly into the pair of rails. In the case of current fixations of a seat belt retractor according to prior art, for example on the seat shell, this is not so; here, the crash torques must be transmitted to the pairs of rails via the side parts of the seat and so on.

It is preferred that the tie bar is bent at least once, preferably several times. This increases the stability. The tie bar preferably has a molding that matches the seat belt retractor. As a result, the seat belt retractor is also matingly retained. Preferably, the seat belt retractor, which is fastened to the tie bar, is nearer to the one seat rail than to the other seat rail, it is more specifically spaced at least twice, in particular four times, the distance from the one seat rail than from the other seat rail.

BRIEF DESCRIPTION OF THE DRAWINGS

Other features and advantages will become more apparent upon reviewing the appended claims and the following non restrictive description of three embodiments of the invention, given by way of example only with reference to the drawing. In the drawing:

FIG. 3 shows a perspective illustration of an arrangement similar to FIG. 2 with approximately the same viewing direction as in FIG. 1.

DETAILED DESCRIPTION

Figure 1:
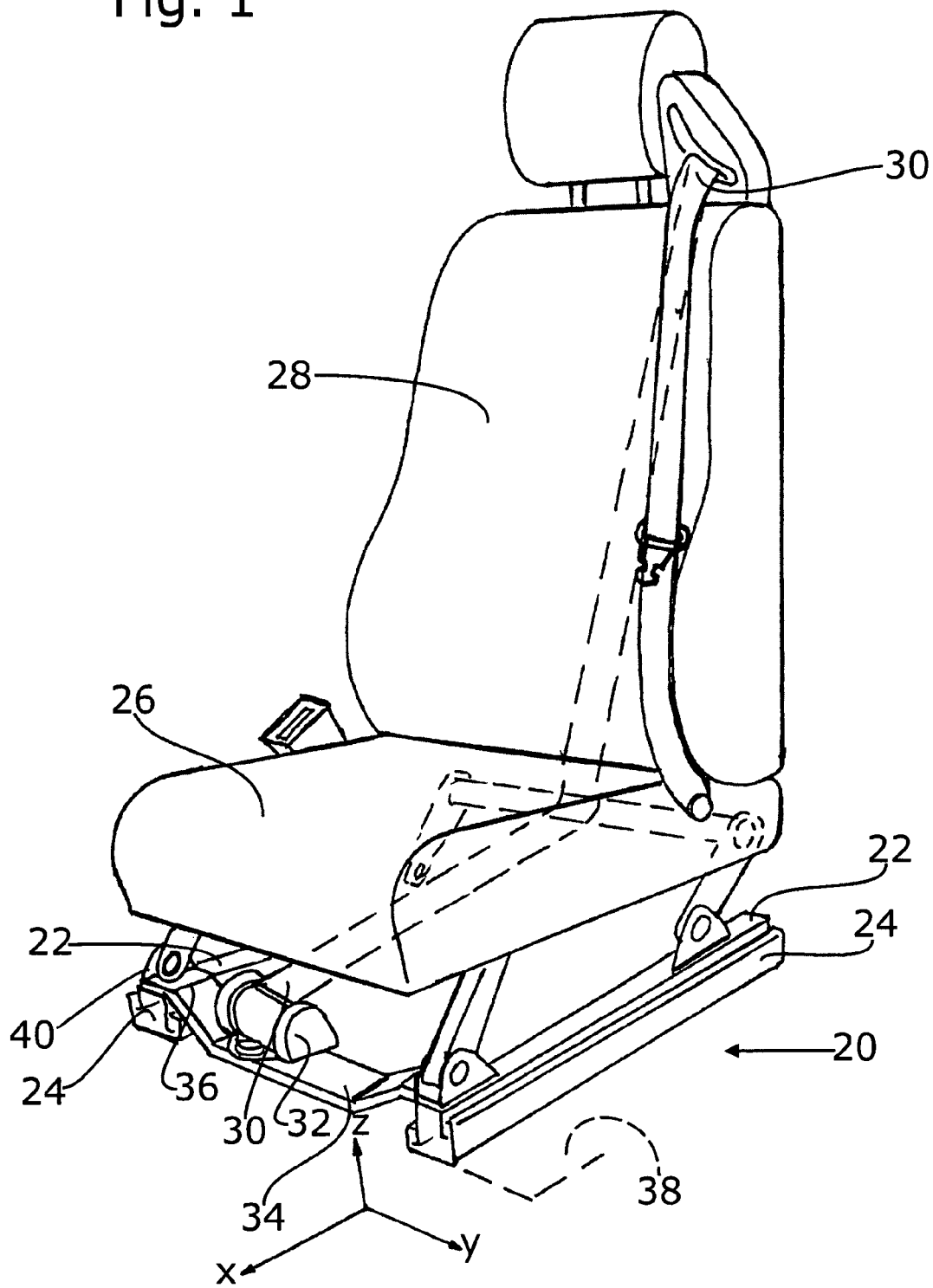
FIG. 1 shows a perspective illustration of a belt integrated motor vehicle seat, when viewed obliquely from the front and the top.

The motor vehicle seat shown in FIG. 1 has an underframe 20 comprising two pairs of rails, each comprising a seat rail 22 and a floor rail 24. The floor rail 24 has fastening means for fastening to the rail to an underbody (not shown) of a motor vehicle. In one embodiment, the underframe also has front and rear rocker arms carrying a seat part 26 that is height adjustable thanks to these rocker arms and to not illustrated catch devices. The motor vehicle seat further has a back rest 28, a seat belt 30 and a seat belt retractor 32.

There is provided a tie bar 34 that extends from the one seat rail 22 to the other seat rail 22 and that is connected at either end to the seat rail 22. The seat belt retractor 32 is fastened to this tie bar 34. In the implementation shown in FIG. 1, it is fastened above the tie bar 34, in the other two exemplary embodiments it is disposed beneath the tie bar. The tie bar 34 is implemented as a pressed or stamped sheet steel part. It is bent several times, in the concrete exemplary embodiment it has four bendings 36, the bending line of these bendings extending in the x direction. In the implementation shown in FIG. 1, the tie bar 34 is bent downward in such a manner that its lower edge is only a few millimeters above a place 38 in which there are located the undersides of the floor rails 24. In the concrete implementation, the tie bar 34 is adapted to the structure of the underbody of the motor vehicle. If the underbody is limited by the course of the plane 38, the underside of the tie bar 34 or the seat belt retractor 32 in the other exemplary embodiments is spaced a small clear distance apart from this plane 38. As a result, the available space is utilized.

The exemplary embodiment shown in FIG. 1 shows that, on at least one seat side, flanges 40 to which a front hinge support is hinged are formed integrally with the tie bar 34. This is also the case in the two other exemplary embodiments, although only for the right pair of rails (when viewed in the x direction) in FIG. 3.

As shown in the Figs., the seat belt retractor 32 is arranged at an angle to the tie bar 34, the angle is an acute angle and is less than about 30°, preferably less than about 15°.

The tie bar 34 is also stiffened by longitudinal profiles in which bending lines extend parallel to the y direction; this is not shown in FIG. 1 but in the other exemplary embodiments. As a result, the resistance torque is increased.

The width of the tie bar 34 measured in the x direction is matched with a corresponding dimension of the seat belt retractor 32. As shown in the Figs., the tie bar 34 is approximately as wide as the seat belt retractor 32, the width ranging from about 60 to about 120% and preferably being approximately 80%.

Although the tie bar 34 is disposed between the hinge points of the front pivotal supports in each of the three exemplary embodiments, variants are possible. The tie bar 34 is preferably located nearer to the seat front edge than to the seat rear edge. It is preferably located in the front half of the seat part, meaning in the x direction between the seat front edge and the seat centre.

As shown in FIG. 3, it is possible to fasten the tie bar 34, at least on one seat side, not directly on the seat rail but indirectly via an intermediate piece. This is the case for the left pair of rails in FIG. 3. There, the tie bar 34 is connected via two fastening regions to a trough-shaped longitudinal part 42 which in turn is fastened directly on the upper side of the seat rail 22. In FIG. 3, by contrast, the right end of the tie bar is connected directly with the seat rail 22 located there and forms the integral flange 40. The transverse profile and the longitudinal profile of the tie bar 34 can be seen in FIG. 3.

In all the exemplary embodiments, the seat belt retractor 32 is located on the one side of a seat center when viewed in the y direction or, put another way, on the one side of a central line between the two pairs of rails running in the x direction. The seat belt retractor 32 is located nearer to the seat rail 22 located on the inboard side than to the seat rail 22 located on the outboard side.

Figure 2:
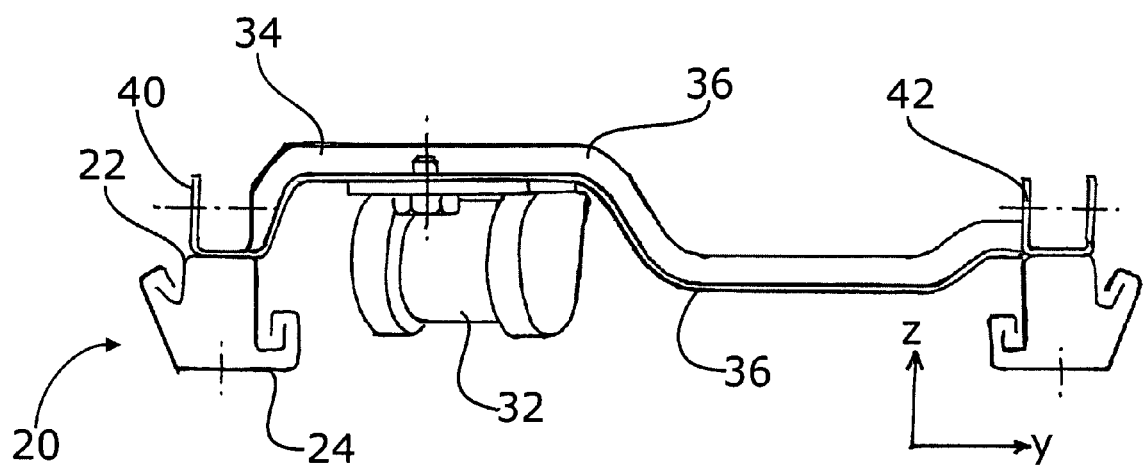
FIG. 2 shows a view in the negative x direction of two pairs of rails, a tie bar and a seat belt retractor having another configuration than in FIG. 1.

As shown in particular in the FIGS. 1 and 2, the tie bar 34 comprises a trough-shaped molding that matches and receives the seat belt retractor 32. Mating reception is advantageous. In FIG. 3, the space in which the seat belt retractor 32 is accommodated is limited on the one side by the right pair of rails, more specifically by the floor rail 24, and on the other side by a molding of the tie bar 34 that is configured to be an elbow.

What is claimed is:

1. A motor vehicle seat with an underframe comprising: a first pair of rails including a first seat rail and a first floor rail, and a second pair of rails including a second seat rail and a second floor rail; a seat belt and a seat belt retractor; and a tie bar for the seat belt retractor extending from said first seat rail to said second seat rail and connected to said first seat rail and said second seat rail, wherein the seat belt retractor is connected to the tie bar and is disposed either above or below the tie bar, and, measured in a longitudinal direction of said pairs of rails, the tie bar is approximately as wide as the seat belt retractor.

2. The motor vehicle seat as set forth in claim 1, wherein the tie bar is bent at least once, a bending line of the at least one bent extends in said longitudinal direction.

3. The motor vehicle seat as set forth in claim 2, wherein the tie bar is bent several times.

4. The motor vehicle seat as set forth in claim 1, wherein the seat belt retractor is nearer to one of the seat rails in comparison to the other seat rail.

5. The motor vehicle seat as set forth in claim 4, wherein the seat belt retractor is spaced at least twice the distance from one of the seat rails in comparison to the other seat rail.

6. The motor vehicle seat as set forth in claim 5, wherein the seat belt retractor is spaced at least four times the distance from one of the seat rails in comparison to the other seat rail.

7. The motor vehicle seat as set forth in claim 1, wherein said motor vehicle seat has an inboard side and an outboard side, said seat belt retractor is located nearer to said inboard side than to said outboard side.

8. The motor vehicle seat as set forth in claim 1, wherein a distance between a plane defined by an underside of said floor rails and at least one of said seat belt retractor and said tie bar, is smaller than about 50 mm.

9. The motor vehicle seat as set forth in claim 1, wherein the tie bar defines a trough that receives the seat belt retractor.

10. The motor vehicle seat as set forth in claim 1, wherein a distance between a plane defined by an underside of said floor rails and at least one of said seat belt retractor and said tie bar, is smaller than about 30 mm.

11. The motor vehicle seat as set forth in claim 1, wherein the tie bar is about 60% to about 120% as wide as the seat belt retractor.

* * * * *